United States Patent
Schulze Selting et al.

(10) Patent No.: US 9,408,346 B2
(45) Date of Patent: Aug. 9, 2016

(54) COMBINE HEADER WITH SUPPORT WHEELS

(71) Applicant: Carl Geringhoff GmbH & Co. KG, Ahlen (DE)

(72) Inventors: Stephan Schulze Selting, Enniger (DE); Dirk Webermann, Senden (DE); Bernd Albinger, Rheda-Wiedenbrück (DE); Reimer Tiessen, Oldenburg (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 0 days.

(21) Appl. No.: 14/749,664

(22) Filed: Jun. 25, 2015

(65) Prior Publication Data

US 2015/0373908 A1   Dec. 31, 2015

(30) Foreign Application Priority Data

Jun. 25, 2014   (DE) .................... 10 2014 009 158

(51) Int. Cl.
*A01D 67/00* (2006.01)
*A01D 41/14* (2006.01)
*A01D 75/00* (2006.01)

(52) U.S. Cl.
CPC ............... *A01D 41/14* (2013.01); *A01D 75/00* (2013.01)

(58) Field of Classification Search
CPC . A01D 41/141; A01D 41/145; A01D 75/287; A01D 89/004; Y10S 56/15; Y10S 56/10; A01B 69/008
USPC .......... 56/208, 10.2 E, DIG. 15, 15.8
See application file for complete search history.

(56) References Cited

U.S. PATENT DOCUMENTS

| | | | | |
|---|---|---|---|---|
| 2,501,533 A * | 3/1950 | Miyagi | ........... | A01D 45/10 56/10.6 |
| 2,660,015 A * | 11/1953 | Briscoe | ........... | A01D 46/08 56/10.9 |
| 2,955,813 A * | 10/1960 | Hume | ........... | A01D 34/03 267/173 |
| 3,249,366 A * | 5/1966 | Meyer | ........... | A01B 69/008 104/244.1 |
| 3,257,787 A * | 6/1966 | Wells | ........... | A01D 27/04 56/121.45 |
| 3,349,549 A * | 10/1967 | Van Der Lely | ........... | A01D 34/28 56/10.2 R |
| 3,633,345 A * | 1/1972 | Scarnato | ........... | A01D 43/105 56/14.1 |
| 3,675,404 A * | 7/1972 | Izakson | ........... | A01D 75/287 56/209 |
| 3,747,311 A * | 7/1973 | DeCoene | ........... | A01D 41/141 56/208 |

(Continued)

*Primary Examiner* — Árpád Fábián-Kovács
(74) *Attorney, Agent, or Firm* — Gudrun E. Huckett

(57) ABSTRACT

A combine header for a harvesting machine is provided with a frame and a cutter bar connected to a leading end of the frame. A conveying device connected to the frame conveys stalk material cut by the cutter bar. A drive device drives the cutter bar and the conveying device. First support wheels are connected to the frame at lateral ends of the combine header and support the combine header on the ground. The support wheels arranged underneath the combine header.

9 Claims, 5 Drawing Sheets

(56) References Cited

U.S. PATENT DOCUMENTS

| | | | | |
|---|---|---|---|---|
| 3,755,998 | A * | 9/1973 | Hoffmeyer | A01D 34/63 280/43 |
| 3,908,345 | A * | 9/1975 | Oni | A01D 41/141 56/10.9 |
| 3,925,971 | A * | 12/1975 | Goering | A01D 89/004 56/15.8 |
| 4,151,700 | A * | 5/1979 | Gardella | A01D 45/065 56/13.7 |
| 4,193,250 | A * | 3/1980 | Kessens | A01D 41/141 56/208 |
| 4,206,582 | A * | 6/1980 | Molzahn | A01D 57/00 56/15.8 |
| 4,612,757 | A * | 9/1986 | Halls | A01D 75/287 56/10.2 E |
| 4,633,656 | A * | 1/1987 | Willinger | A01D 34/664 56/13.6 |
| 4,641,490 | A * | 2/1987 | Wynn | A01D 41/145 56/10.2 E |
| 4,845,931 | A * | 7/1989 | Bruner | A01D 57/04 56/10.2 R |
| 5,465,560 | A * | 11/1995 | Panoushek | A01D 41/141 56/10.2 E |
| 5,799,483 | A * | 9/1998 | Voss | A01D 75/287 460/119 |
| 6,244,027 | B1 * | 6/2001 | McClure | A01D 89/004 56/208 |
| 6,289,659 | B1 * | 9/2001 | Fox | A01D 46/08 56/10.2 E |
| 6,789,379 | B2 * | 9/2004 | Heidjann | A01D 67/00 56/10.2 E |
| 6,843,046 | B2 * | 1/2005 | Heidjann | A01D 67/00 56/208 |
| 7,299,611 | B2 * | 11/2007 | Orsborn | A01D 46/14 56/233 |
| 7,430,846 | B2 * | 10/2008 | Bomleny | A01D 41/141 56/10.2 E |
| 7,640,720 | B1 * | 1/2010 | Lovett | A01D 57/20 56/153 |
| 7,661,251 | B1 * | 2/2010 | Sloan | A01D 41/141 56/10.2 E |
| 7,908,838 | B2 * | 3/2011 | Hohlfeld | A01D 43/081 56/228 |
| 7,971,420 | B1 * | 7/2011 | Bollin | A01D 41/145 56/208 |
| 8,245,489 | B2 | 8/2012 | Talbot | |
| 2010/0281837 | A1 * | 11/2010 | Talbot | A01D 41/141 56/10.2 E |

* cited by examiner

COMBINE HEADER WITH SUPPORT WHEELS

BACKGROUND OF THE INVENTION

The present invention concerns a combine header for a harvesting machine, comprising a frame, a cutter bar, a conveying device for cut stalk material, and drive devices for driving the cutter bar and the conveying device, and support wheels attached to the outer sides of the combine header for supporting the combine header on the ground.

A combine header of the aforementioned kind is disclosed in U.S. Pat. No. 8,245,489. The combine header is connected by means of an adapter frame to the feed channel of a combine harvester. The feed channel is height-adjustable and the combine header is additionally pivotable and height-adjustable by means of the adapter frame. In addition, the combine header is also supported by support wheels on the ground wherein the support wheels are arranged at a spacing behind the combine header and are height-adjustable. As a result, in this solution three height-adjustable components must be joined with each other in a common control device in order to be able to guide the combine header close to the ground. The support wheels themselves are unsuitable for guiding the combine header close to the ground because they are arranged at a significant spacing away from the cutter bar that is decisive for the cutting function of the combine header. Additional sensing devices are required for sensing the ground contour upstream of or below the combine header and transmit the sensor signals to an electronic control unit that, in turn, must send control signals that effect adaptation of the relative position of the combine header to the ground contour so that the combine header is still maintained at a distance to the ground but close to the ground. Such a solution appears to be very complex.

In particular, it appears to be difficult to combine such a combine header with automatic height control of different combine models of different manufacturers so as to provide proper functionality because they are each provided with different control algorithms with different control strategies, control rates, and control parameters.

It is the object of the present invention to simplify the guiding action of a combine header close to the ground during harvesting.

SUMMARY OF THE INVENTION

The object is solved for a combine header of the aforementioned kind in that the support wheels are arranged underneath the combine header.

When arranging the support wheels directly underneath the combine header, the spacing of the support wheels relative to the cutter bar is much shorter than in the solutions presented in the prior art. When the ground contour changes upon advancement of the harvesting machine across a field to be harvested, the height change is noticeable also at the support wheels immediately after the cutter bar has passed the location with the change in height. When the ground contour descends, the support wheels will also descend in downward direction following the descending ground contour and the combine header part supported by the corresponding support wheel on the ground drops down following the support wheel. When the ground ascends, the support wheels, as they roll across the ascending ground, are also pushed upwardly together with the corresponding combine header part supported by the support wheel on the ground.

By selecting an appropriate size of the support wheel in relation to its spacing to the cutter bar, an assumed maximum slope angle that may occur across the course of the field, and a minimum height at which the combine header is to be maintained above the ground, it is possible to perform the ground adaptation of the combine header part supported by the respective support wheel passively simply by copying the ground by means of the respective support wheel when driving across the field with the harvesting machine. It is not required to motorically adjust the adjusted height of the support wheel actively during forward travel of the harvesting machine. It is sufficient to attach the support wheels stationarily on the combine header parts so that they adjust the height adjustment level of the combine header during forward travel with the harvesting machine always precisely by the amount by which the ground ascends or descends within the traveled-across zone.

With this solution it is thus no longer required to connect the height control of the support wheels with the pivoting and height control of the adapter frame and of the feed channel of the harvesting machine. Accordingly, the combine header can be attached easily to various combine harvester types of different manufacturers without requiring an adaptation of the electronic control unit. The control strategies for the automatic combine header height control can be simplified significantly because at least the support wheels as a variable component must not be taken into account in the electronic control unit. The combine header as a whole becomes lighter because the drives and actuators for height control of the support wheels can be omitted so that the mass inertia of the combine header parts is reduced and the adaptation speed of the combine header parts to different ground conditions is increased.

By arranging the support wheels underneath the combine header, it is prevented that a support wheel projects laterally and rolls within the not yet harvested part of the stalk material to be harvested at one side or both sides of the combine header. The width of the combine header is thus not additionally expanded by the support wheels, particularly not by components that project laterally past the effective working width of the cutter bar.

According to one embodiment of the invention, the support wheels are attached with negative camber on the combine header and their outer circumference is greater on the outwardly facing side than on the inwardly facing side. Due to the attachment of the support wheel on the combine header with negative camber, the support wheel is not positioned with its complete height underneath the combine header but only with a portion of its maximum diameter. The wheel can therefore absorb greater forces without causing the combine header to have to be guided too high above the ground or the cutter bar to have to be positioned at too steep a pitch angle relative to the ground.

According to one embodiment of the invention, the support wheels are attached with positive camber on the combine header and their outer circumference on the side which is facing the combine header is smaller than on the side which is facing away from the combine header. This configuration constitutes only a reversal of the aforementioned embodiment and the afore described advantages apply likewise to this embodiment.

According to one embodiment of the invention, the support wheels are designed as metal plates. The metal plates are inexpensive to produce as a stamped part or pressed part. They exhibit a comparatively high load resistance and wear resistance. Damages that may occur during use can be repaired easily by welding.

According to one embodiment of the invention, the metal plates have a concavely curved closed surface that is facing the ground. The concavely curved closed surface avoids sharp impact when a support wheel is contacting the ground. Due to the smoothly rising curvature of the concavely curved metal plate, the combine header part which is supported by the support wheel is lifted or lowered continuously in a fluid movement. In this context, force peaks occurring without the curvature of the support wheel are attenuated within the support wheel.

According to an embodiment of the invention, the metal plates have a profiling. Due to the profiling, the support wheel can produce a form-fit connection with the ground by means of which the rolling movement of the support wheel across the ground is improved.

According to an embodiment of the invention, the support wheels are each connected to a shaft which is stationarily connected to the frame of the combine header. Due to the stationary attachment of the support wheels, a defined support behavior of the support wheels is observed. The stationary attachment is robust, maintenance-free, and rarely failure-prone. The construction as a whole is light and can be comprised of a cranked pipe.

According to one embodiment of the invention, the combine header has a central segment that is connectable to the feed channel of the harvesting machine with which two lateral segments laterally arranged thereto are pivotably connected, respectively, and one support wheel each is arranged in the area of the outer edge of a lateral segment. This embodiment provides a simple, robust, and uncomplicated height control and pivoting of the combine header across its entire working width. The automatic height control that is already existing on the harvesting machine can limit its action to adjusting, with existing control parameters and control algorithms, the height of the feed channel as a function of predetermined sensor data, wherein the height position of the central segment is changed accordingly. If present, the automatic height control already existing on the harvesting machine can control additionally also the pivot movement of the central segment with the existing control parameters and control algorithms. A modification of the automatic height control already existing on the harvesting machine is therefore not required when the combine header designed in accordance with the invention is attached to any make of a harvesting machine with automatic height control existing already on the harvesting machine.

The height control of the lateral segments can then be performed independently by the automatic height control already existing on the harvesting machine without this causing priority conflicts in the control strategy of the automatic height control already existing on the harvesting machine and the height control for the lateral segments. It is thus possible to passively realize the height control of the lateral segments and their pivoting for copying the ground during harvesting solely by their support at the outer or lateral end by means of the support wheels on the ground and, on the inner side, by means of the pivot joint to the central segment. Alternatively, it is possible to relief the support wheels at least partially by means of adjustable force stores and/or to adjust the working height of the lateral segments by means of force stores or actuators to a desired working position close to the ground; in this position, they are adjusted as needed only in case of extreme space changes relative to the ground by means of the support wheels and/or the force stores and/or actuators into another relative position relative to the harvesting machine.

According to one embodiment of the invention, support wheels are arranged also on the central segment and/or in the area of the inner end of the lateral segments. By means of the support wheels on the central segment the pivot joint connection between the central segment and the lateral segments is additionally supported and an otherwise possibly imminent ground contact of the cutter bar in this area of the combine header is reliably prevented.

It is expressly noted that each of the aforementioned embodiments of the invention can be used alone but also in any combination with each other with the subject matter of the independent claim as long as this is not prevented by technical barriers.

Further modifications and embodiments of the invention can be taken from the following description and the drawings.

BRIEF DESCRIPTION OF THE DRAWINGS

The invention will be explained in the following with the aid of an embodiment in more detail.

DESCRIPTION OF PREFERRED EMBODIMENTS

Figure 1:
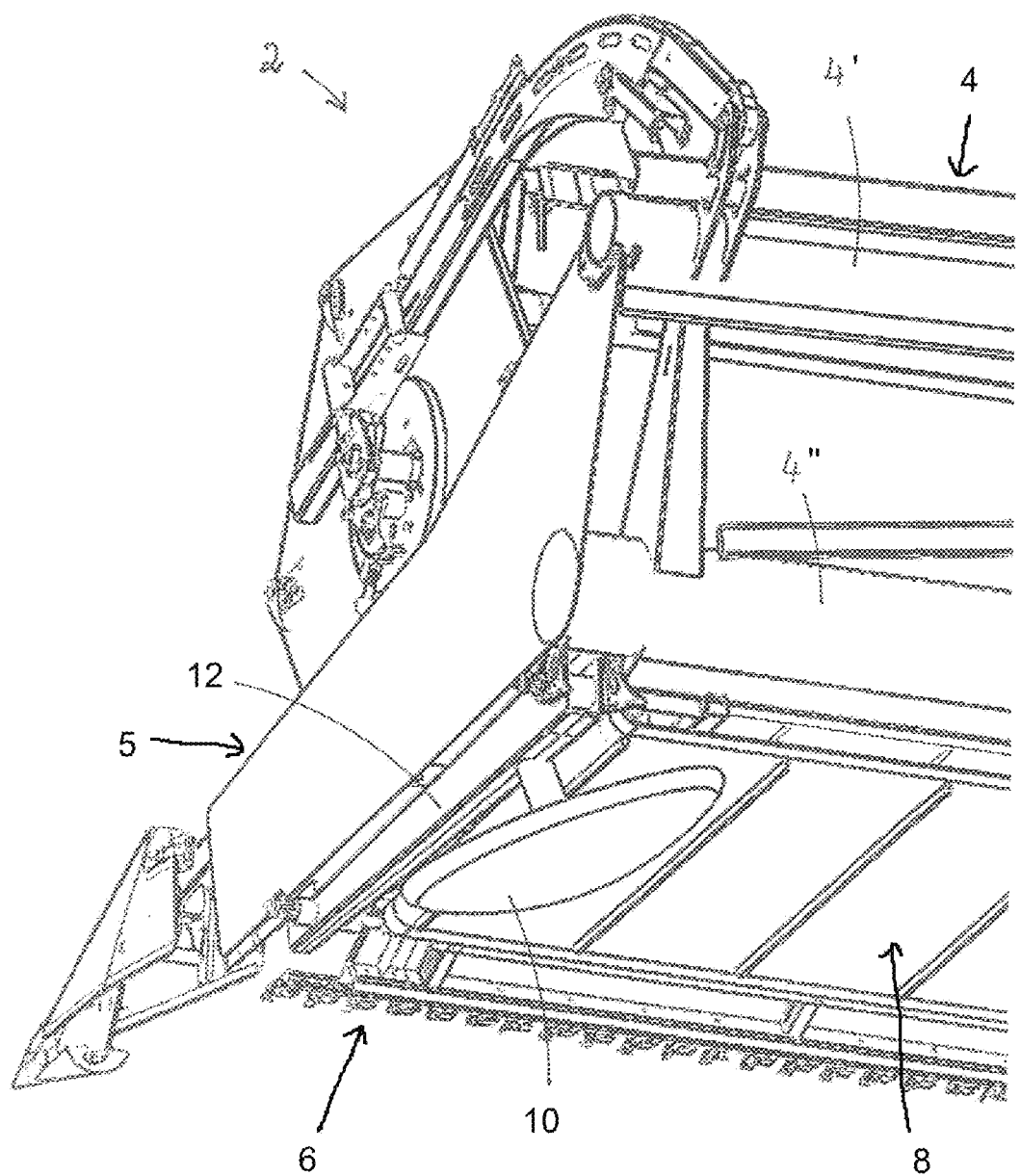
FIG. 1 shows a view of the lateral end of a combine header at a slant from below.
Figure 1B:
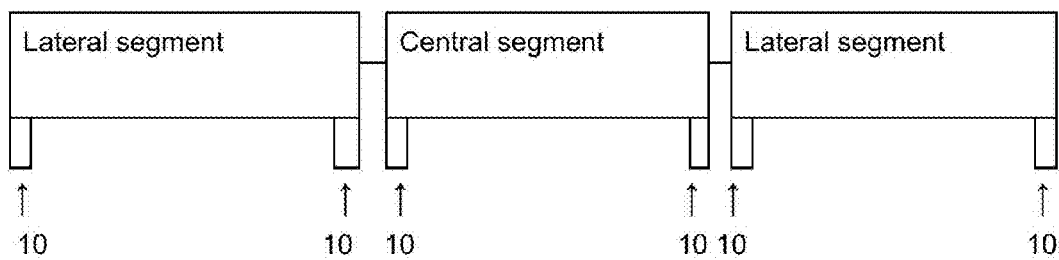
FIG. 1b shows schematically a combine header with center segment and two lateral segments provided with support wheels.
Figure 1A:
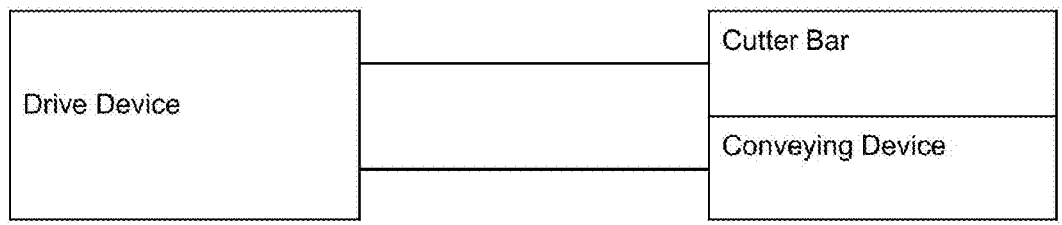
FIG. 1a shows schematically a drive device acting on the cutter bar and the conveying device of the combine header.

In FIG. 1, the combine header 2 is shown in a view at a slant from below. In this view, the frame 4 can be seen which in the embodiment comprises two transverse beams 4', 4" from which the sidewall 5 is extending forwardly. Between the transverse beams 4', 4" of the frame 4 and the cutter bar 6 attached to the leading end of the combine header 2, there is a conveying device 8. The conveying device 8 in the embodiment is a draper conveying device. In deviation therefrom, other conveying devices such as conveyor screws can be used also.

Below the sidewall 5 at the lateral end of the combine header 2, the frame 4 comprises a bar 12 fixedly connected to elements of the frame 4. The support wheel 10 is attached to the bar 12.

The support wheel 10 is located underneath the combine header 2. As can be seen in the rear view of the combine header 2 in FIG. 2, the support wheel 10 is projecting only slightly past the sidewall 5 of the combine header 2. The larger part of the support wheel 10 is located underneath the lateral end of the combine header 2. The rear view illustrated in FIG. 2 also shows that the support wheel 10 in the embodiment has a great negative camber. Accordingly, the constructive height h is significantly smaller than the diameter D of the support wheel 10.

Figure 2:
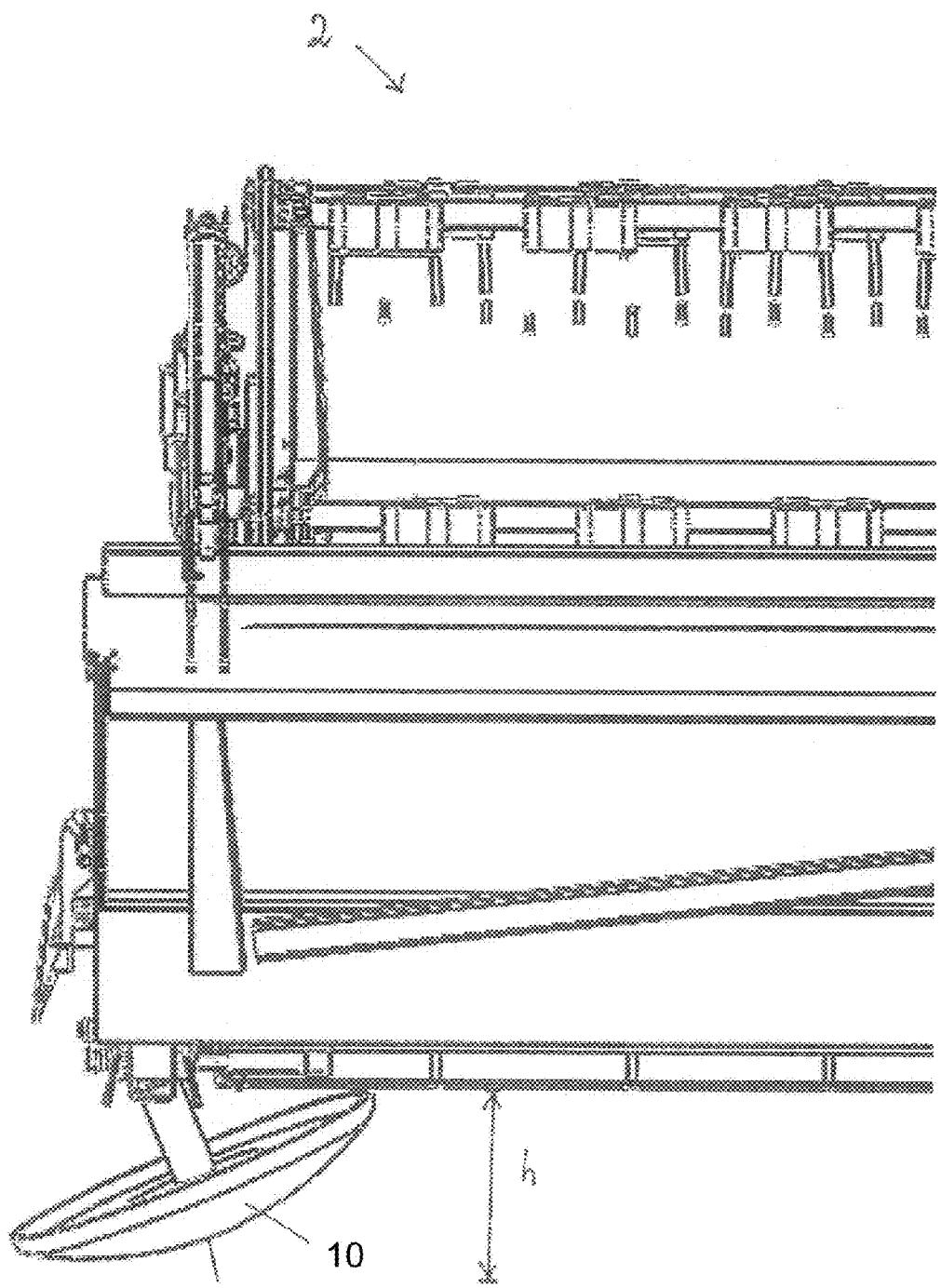
FIG. 2 is a rear view of the lateral end of the combine header.

In the rear view illustrated in FIG. 2, the concavely curved closed surface 14 of the support wheel 10 can be seen. As the support wheel 10 approaches the ground, due to the camber angle of the negative camber and the concavely curved closed surface of the support wheel 10, a smooth gliding of the support wheel 10 occurs when it contacts the ground. By rotational movement, the support wheel 10 upon impacting on an obstacle can roll across so that the support wheel 10 must not drag across the ground and the support wheel 10 can lift the combine header 2 at the end where the support wheel 10 is arranged when the pressure on the surface on which the support wheel 10 is rolling is sufficiently high.

The concavely curved surface provides that the outer circumference of the support wheel 10 on the outwardly facing side is greater than on the inwardly facing side. In deviation from this embodiment, different configurations of the support wheel 10 can be selected also.

Figure 3:
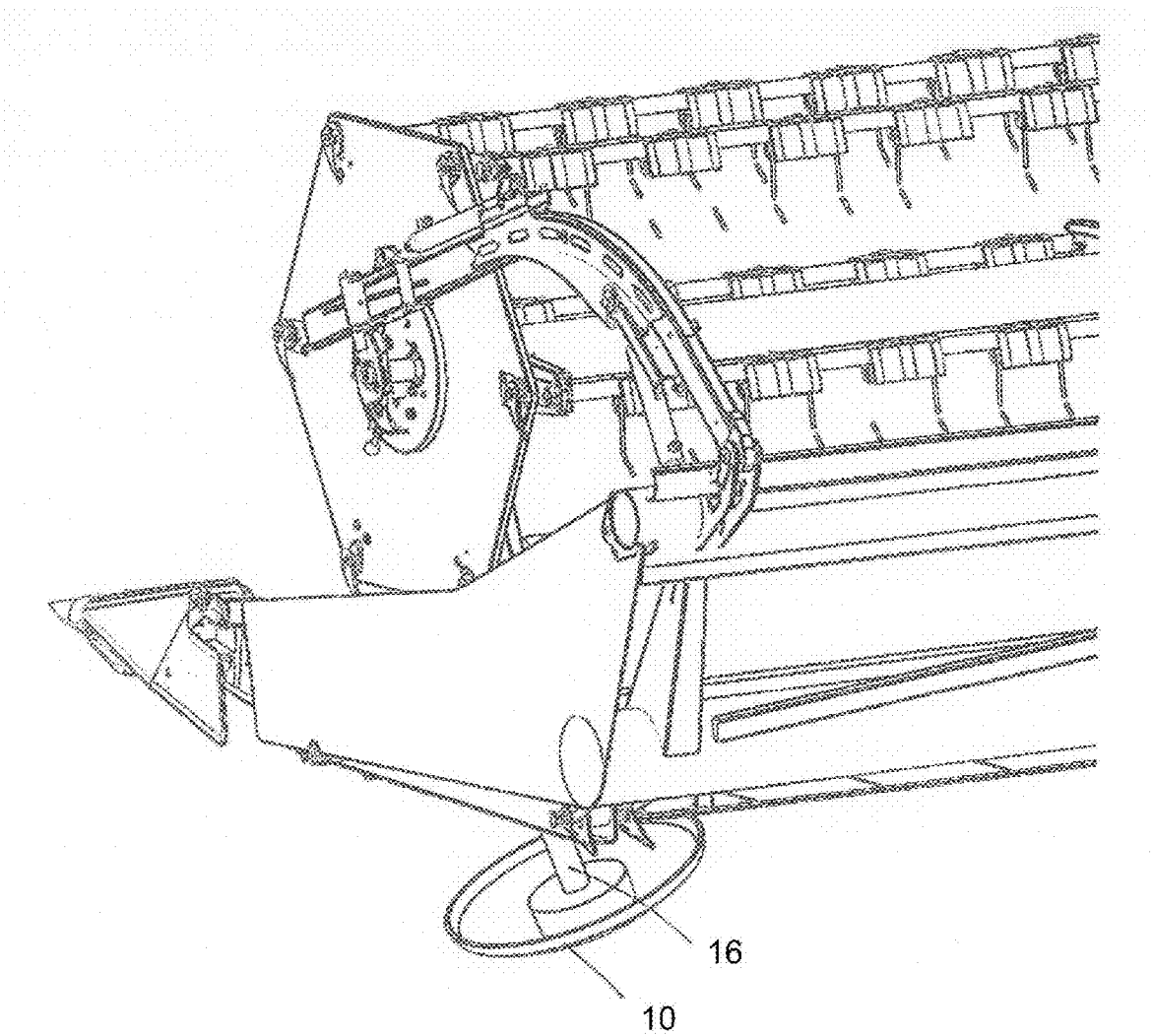
FIG. 3 shows the combine header in a view at a slant from above.

FIG. 3 shows in a view at a slant from above onto the lateral end of the combine header 2 that the support wheel 10 is connected by a shaft 16 with the frame 4. The shaft 16 in the embodiment is slightly cranked inwardly in order to provide in this way the negative camber of the support wheel 10.

Figure 4:
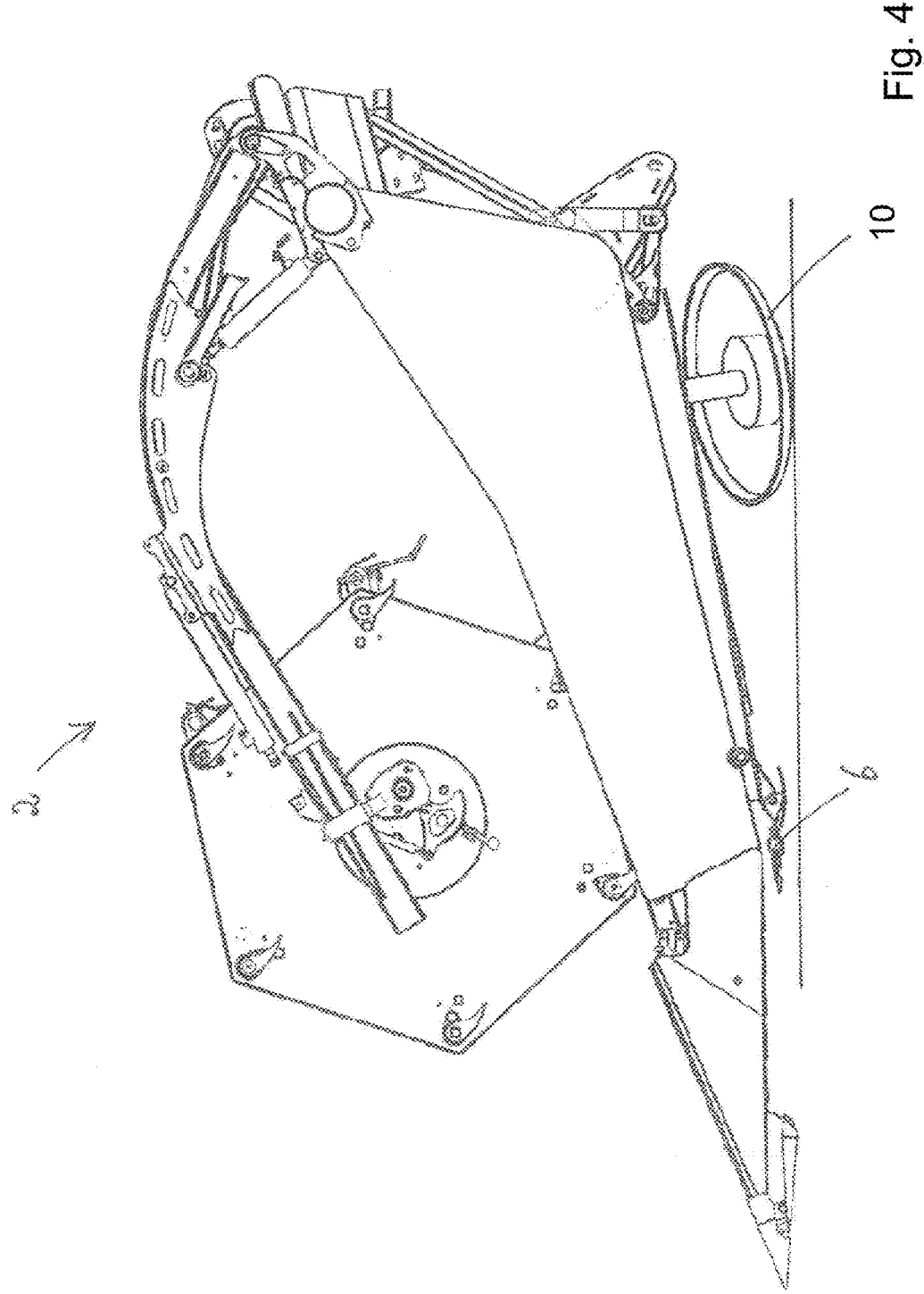
FIG. 4 shows a side view of the combine header.

In the side view of the combine header 2 illustrated in FIG. 4, it can be seen that the support wheel 10 is positioned in such a way underneath the combine header 2 that upon contact with the ground it secures the cutter bar 6 still at a spacing to the ground. FIG. 4 also shows that upon slight ascend of the ground during forward travel of the combine header 2 the cutter bar 6 may rest on the ground; however, in such a case, the support wheel 10 reaches the ascending ground section shortly after the cutter bar 6 so that the support wheel 10 then mandatorily pushes the corresponding end of the combine header 2 in upward direction.

In the present embodiment, the cutter bar 6 is supported pivotably so that the cutter bar 6 still has an adjusting travel for yielding by means of which damage of the cutter bar 6 by contact with the ground is prevented. When the cutter bar 6 is connected rigidly with the frame 4, the support wheel 10 can be positioned even closer to the cutter bar 6 or with a greater support height underneath the combine header 2.

The specification incorporates by reference the entire disclosure of German priority document 10 2014 009 158.9 having a filing date of Jun. 25, 2014.

The afore described embodiment serves for explaining the invention. The invention is not limited to the embodiment. A person of skill in the art will have no difficulties in modifying the embodiment in a way appearing suitable to him in order to adapt it to a concrete application situation without deviating thereby from the teachings of the invention.

While specific embodiments of the invention have been shown and described in detail to illustrate the inventive principles, it will be understood that the invention may be embodied otherwise without departing from such principles.

What is claimed is:

1. A combine header for a harvesting machine, the combine header comprising:
   a frame;
   a cutter bar connected to a leading end of the frame;
   a conveying device connected to the frame and adapted to convey stalk material cut by the cutter bar;
   a drive device adapted to drive the cutter bar and the conveying device;
   first support wheels connected to the frame at lateral ends of the combine header and supporting the combine header on the ground;
   the first support wheels arranged underneath the combine header;
   wherein the first support wheels each are mounted with a shaft on the frame and are positioned with a negative camber or with a positive camber;
   wherein the first support wheels each comprise an outer circumference that is greater on a side of the first support wheels that is facing the shaft than on a side of the first support wheels that is facing away from the shaft, respectively;
   wherein the first support wheels each have a constructive height, measured respectively between the lowermost point of the first support wheels and the frame, that is smaller than a diameter of the first support wheels, respectively.

2. The combine header according to claim 1, wherein the first support wheels are metal plates.

3. The combine header according to claim 2, wherein the metal plates each comprise a concavely curved closed surface facing the ground.

4. The combine header according to claim 2, wherein the metal plates each comprise a profiling.

5. The combine header according to claim 1, wherein the shafts are connected stationarily to the frame.

6. The combine header according to claim 1, further comprising a central segment adapted to be connected to a feed channel of the harvesting machine, a first lateral segment and a second lateral segment pivotably connected laterally to opposite ends of the center segment, respectively, wherein the first and second lateral segments each have one of the first support wheels arranged in an area of an outer edge of the first and second lateral segments, respectively.

7. The combine header according to claim 6, further comprising second support wheels arranged on the center segment.

8. The combine header according to claim 7, further comprising third support wheels arranged in an area of an inner end of the first and second lateral segments, respectively.

9. The combine header according to claim 6, further comprising second support wheels arranged on the center segment and arranged in an area of an inner end of the first and second lateral segments, respectively.

\* \* \* \* \*